(12) United States Patent
Schultz et al.

(10) Patent No.: US 6,217,103 B1
(45) Date of Patent: Apr. 17, 2001

(54) HINGED TONNEAU TRUCK BED COVER WITH BED DIVIDER

(75) Inventors: Stephanie Stella Schultz, Newport; Bert Theodore Swanson, Brighton; Colleen Marie Hoffman, Canton; Jack V. Giles, Temperance, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/431,323

(22) Filed: Nov. 2, 1999

(51) Int. Cl.[7] .................................................. B60P 7/02
(52) U.S. Cl. ........................... 296/100.09; 296/100.06; 296/37.6; 410/135; 312/257.1; 224/498; 224/404
(58) Field of Search ................. 296/100.06, 100.08, 296/100.09, 37.6; 410/135, 129; 312/257.1, 265.5, 327, 328; 224/497, 498, 404

(56) References Cited

U.S. PATENT DOCUMENTS

| | | | |
|---|---|---|---|
| 4,749,226 | * 6/1988 | Heft | 296/37.6 |
| 4,828,312 | * 5/1989 | Kinkel et al. | 296/37.6 X |
| 4,861,092 | 8/1989 | Bogard | 296/100 |
| 4,943,194 | * 7/1990 | Aguilar | 410/132 |
| 4,946,217 | 8/1990 | Steffens et al. | 296/100 |
| 5,035,563 | * 7/1991 | Mezey | 414/409 |
| 5,056,856 | 10/1991 | Pederson | 296/100 |
| 5,201,561 | * 4/1993 | Brown | 296/37.6 X |
| 5,263,761 | 11/1993 | Hathaway et al. | 296/100 |
| 5,303,841 | * 4/1994 | Mezey | 210/555 |
| 5,857,729 | 1/1999 | Bogard | 296/100.9 |
| 5,893,597 | * 4/1999 | Rider | 296/37.6 X |
| 5,961,173 | * 10/1999 | Repetti | 296/37.6 |
| 6,019,242 | * 2/2000 | Wysocki et al. | 220/571 |

* cited by examiner

*Primary Examiner*—D. Glenn Dayoan
*Assistant Examiner*—Lori L. Coletta

(57) ABSTRACT

A pickup truck cargo bed tonneau cover (30) includes cover panels (32, 34) and a cargo bed partition (50) mounted on a common hinge to suspend the partition (50) beneath the tonneau cover and divide the cargo bed (14) into individual compartments (14a, 14b). The cargo bed/partition includes fasteners (60) to releasably secure the partition (50) in an upright position beneath the tonneau cover and to permit swinging movement of the partition, when released, about the hinge out of the way to accommodate large loads in the cargo bed.

10 Claims, 6 Drawing Sheets

HINGED TONNEAU TRUCK BED COVER WITH BED DIVIDER

BACKGROUND OF THE INVENTION

1. Field of the Invention

The present invention relates to a tonneau cover for the cargo bed of a pickup truck.

2. Description of Related Art

A variety of tonneau covers for covering the open cargo bed of a pickup truck have been developed. One type of tonneau cover involves a flexible canvas or plastic cover tied down or otherwise attached over the cargo bed. Other tonneau covers have included single panel or multi-panel covers of molded rigid fiberglass or plastic bolted or otherwise fastened to the truck bed sidewalls. Multi-panel covers can open to provide access to the cargo bed by raising one or both panels.

An object of the present invention is to provide a tonneau cover for covering the cargo bed of a pickup truck in a manner that provides access to the cargo bed and also partitions the cargo bed into individual compartments.

SUMMARY OF THE INVENTION

The present invention provides a tonneau cover for a cargo bed of a pickup truck wherein the tonneau cover includes first and second cover panels and a cargo bed partition mounted on a common hinge to suspend the partition beneath the tonneau cover and divide the cargo bed into individual compartments. The cargo bed and/or the partition include(s) fasteners to releasably secure the partition in an upright position and to permit swinging movement of the partition, when released, about the hinge out of the way to accommodate large loads in the cargo bed.

In an illustrative embodiment of the present invention, the cover panels include integral hinge leafs that are disposed on a common hinge pin and interleaved between the partition hinge leafs. Alternately, a hinge mechanism is fabricated having a hinge pin and hinge leafs that are fastened to the cover panels and to the partition. The hinge pin is supported on the truck bed at opposite cargo bed side walls. The cargo bed and/or partition include(s) fasteners for releasably securing the partition in an upright position beneath the cover and yet permit swinging movement of the partition, when released, out of the way to accommodate large loads in the cargo bed.

The above objects and advantages of the present invention will become more readily apparent from the following description taken with the following drawings.

DETAILED DESCRIPTION OF THE PREFERRED EMBODIMENT

DETAILED DESCRIPTION OF THE PREFERRED EMBODIMENT

Figure 1:
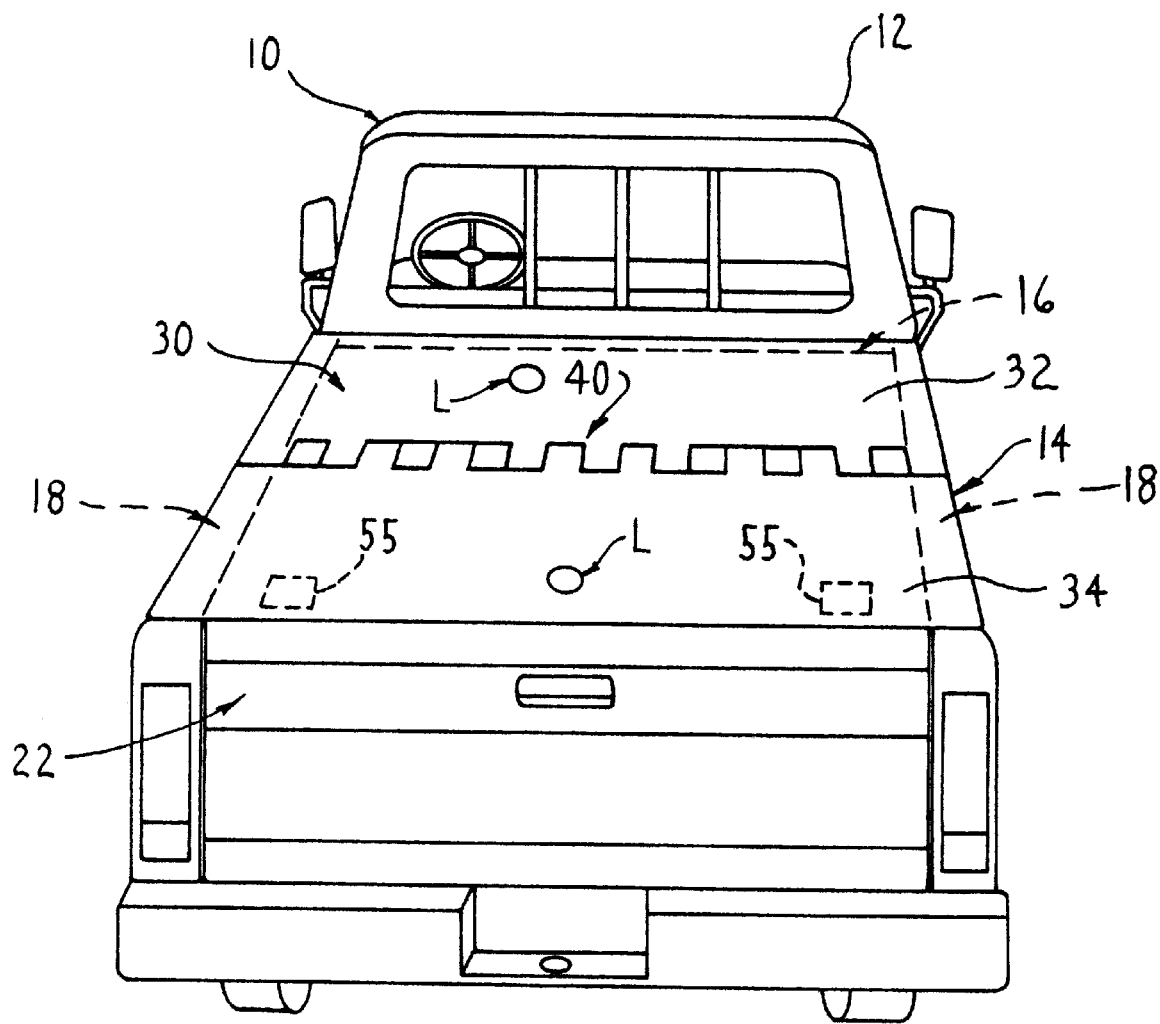
FIG. 1 is a perspective view of a pickup truck having a tonneau cover in accordance with an embodiment of the invention.

Referring to FIGS. 1–4, a conventional pickup truck 10 is shown having a forward cab 12 and rearwardly extending cargo bed 14 defined within a cargo bed front wall 16, a pair of cargo bed side walls 18, cargo bed floor 20 and a conventional rearmost tailgate 22. A tonneau cover 30 pursuant to the present invention is shown covering the otherwise upwardly open cargo bed 14 such that the tonneau cover 30, cargo bed walls 16, 18, floor 20, and tailgate 22 enclose the cargo bed 14.

The tonneau cover 30 includes first and second relatively rigid, self-supporting cover panels 32, 34 comprising molded fiberglass, thermoplastic, or other material such that regions of the cover panels 32, 34 spanning the cargo bed 14 require no direct underlying support from the cargo bed floor 20, but only at the panel peripheral edges. The cover panels 32, 34 are dimensioned to cover the cargo bed 14 and overlap the cargo bed front and side walls 16, 18 and the tailgate 22 where the peripheral edges of the cover 30 are supported. The panels 32, 34 can include optional transverse reinforcement ribs or members (not shown) extending between side walls 18.

Pursuant to an embodiment of the present invention, the cover panels 32, 34 are hinged together transversely of the length of the cargo bed 14 by a hinge mechanism 40 that also hingedly supports a cargo bed partition 50 in a manner that the partition 50 is suspended beneath the cover panels 32, 34 in an upright orientation to divide the cargo bed 14 into individual compartments 14a, 14b. The partition 50 comprises molded fiberglass, thermoplastic, or other material similar to the cover panels 32, 34 and is configured to include arcuate regions 56 on opposite sides that accommodate wheel wells 19 extending into the cargo bed 14 in conventional manner, FIG. 3.

Figure 2:
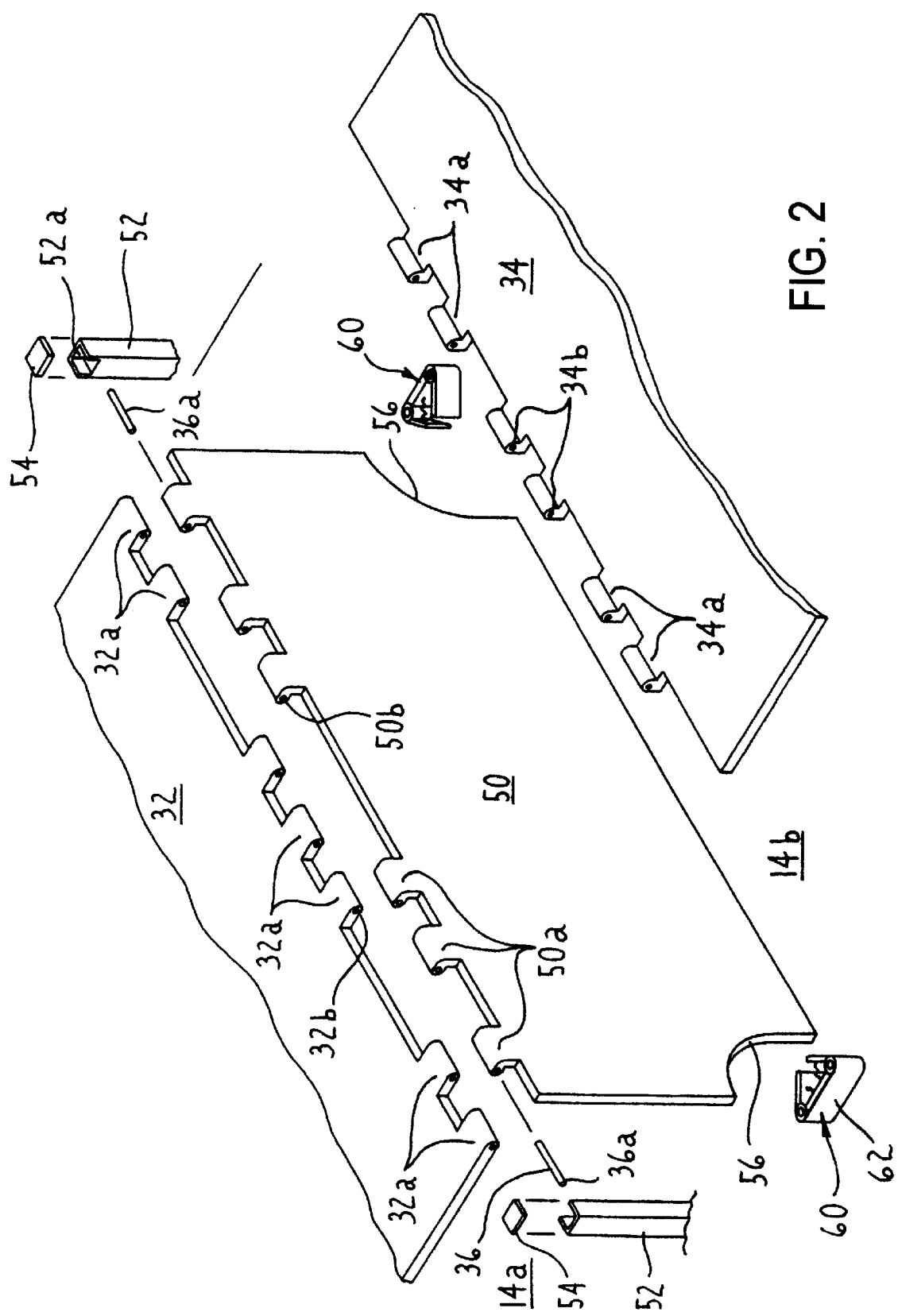
FIG. 2 is an exploded view of the hinge mechanism of the tonneau cover in accordance with an embodiment of the invention.
Figure 3:
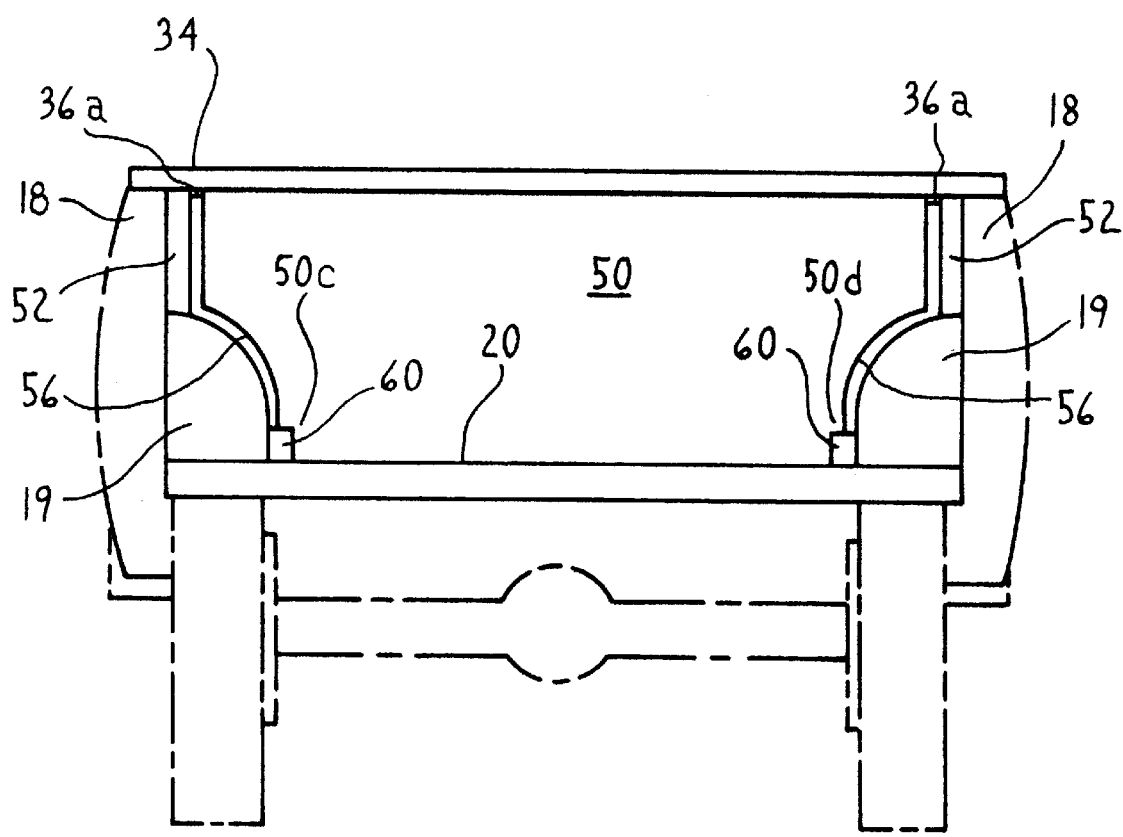
FIG. 3 is an elevational view of the partition in the upright position beneath the tonneau cover.
Figure 4:
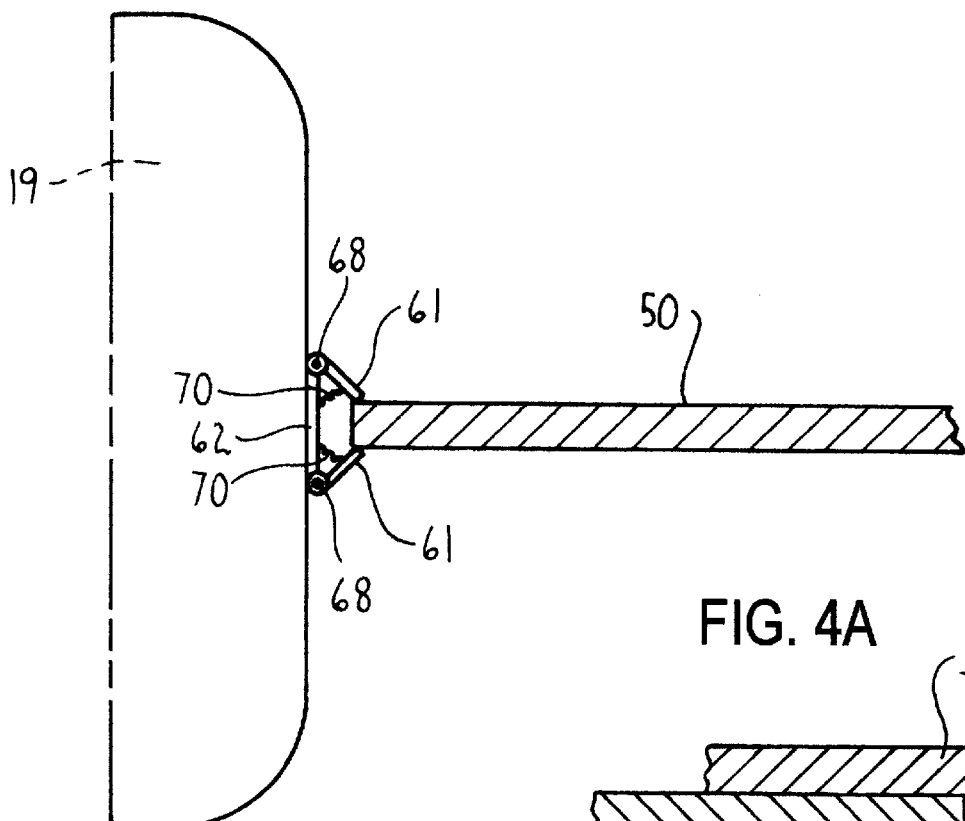
FIG. 4 is partial sectional view of the cargo bed and partition releasably fastened in upright position.
Figure 4A:
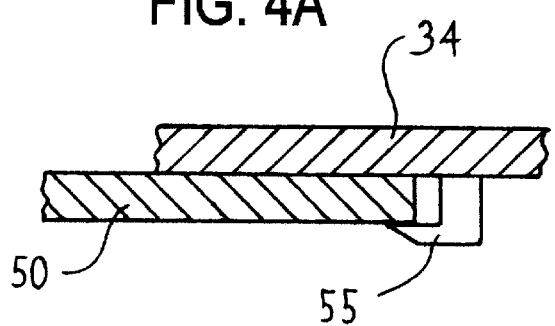
FIG. 4A is a partial sectional view of a spring clip on the underside of the tonneau cover for holding the partition.

In the embodiment illustrated in FIG. 2, the cover panels 32, 34 are shown including integral molded hinge leafs 32a, 34a with transverse passages 32b, 34b that receive an elongated hinge pin 36. The partition 50 is shown including integral molded hinge leafs 50a with transverse passages 50b that also receive hinge pin 36 with the partition hinge leafs 50a interleaved between the cover panel hinge leafs 32a, 34a with the passages 32b, 34b, 50b axially aligned to receive the common hinge pin 36.

The hinge pin 36 is supported at opposite pin ends 36a on support posts 52 fastened by bolting or other fastening technique to the cargo bed sidewalls 18. The posts 52 each include a recessed pocket 52a in which a respective end 36a of the hinge pin 36 is snugly received and retained against movement by a retainer cap 54 that can be snap-fit in each recess 52a.

The wheel wells 19 formed on cargo bed side walls 18 each include first and second fasteners 60 for releasably securing the partition 50 in an upright position beneath the tonneau cover 30 and to permit swinging movement of the partition 50, when released, about the hinge mechanism 40 out of the way to accommodate large loads in the cargo bed. Each fastener 60 comprises a respective pair of opposing spring biased snap clamps 61 on a fixed housing 62 fastened to the proximate cargo bed wheel well 19, FIG. 4. Each snap clamp 61 is pivotably mounted on a respective pivot pin 68 and biased by a respective spring 70 disposed between each clamp 61 and fixed housing 62. Each pair of snap clamps 61 are in opposing relation to one another to clamp the lower corners 50c, 50d of the partition therebetween. For example, one or both of the snap clamps 61 of fastener 60 proximate partition corner 50c can be pivoted about pivot pin(s) 68 by thumb pressure against the bias of spring(s) 70 to permit insertion of corner 50c of the partition 50 between the opposing snap clamps 61. Then, one or both of the snap clamps 61 of the other fastener 60 proximate partition corner 50d can be pivoted about pivot pin(s) 68 by thumb pressure against the bias of spring(s) 70 to permit insertion of the other bottom corner 50d of the partition 50 between the other opposing snap clamps 61.

The partition 50 thereby is positioned upright in the cargo bed 14 to form individual compartments 14a, 14b. The partition 50 is held in position in the cargo bed 14 against movement by the releasable fasteners 60. The partition 50 can be released from the upright position by depressing the snap clamps 61 and swinging the partition 50 upwardly out of the way to accommodate larger cargo as necessary. The partition 50 can be stored in a nearly horizontal position beneath the tonneau cover panel 34 (or panel cover 32) using a pair of molded plastic or metal snap clips 55 molded or fastened on the under side of the cover panel 34 as long as needed to accommodate cargo. The edge of the partition 50 remote from the hinge mechanism 40 simply is swung upwardly about hinge pin 36 and snapped under the clips 55.

The invention also envisions providing fasteners (not shown) on the partition 50 itself, rather than on the wheel wells 19, for engaging a latch, catch, or other cooperating member on the wheel walls 19 to hold the partition 50 in the upright position in the cargo bed 14.

Figure 5:
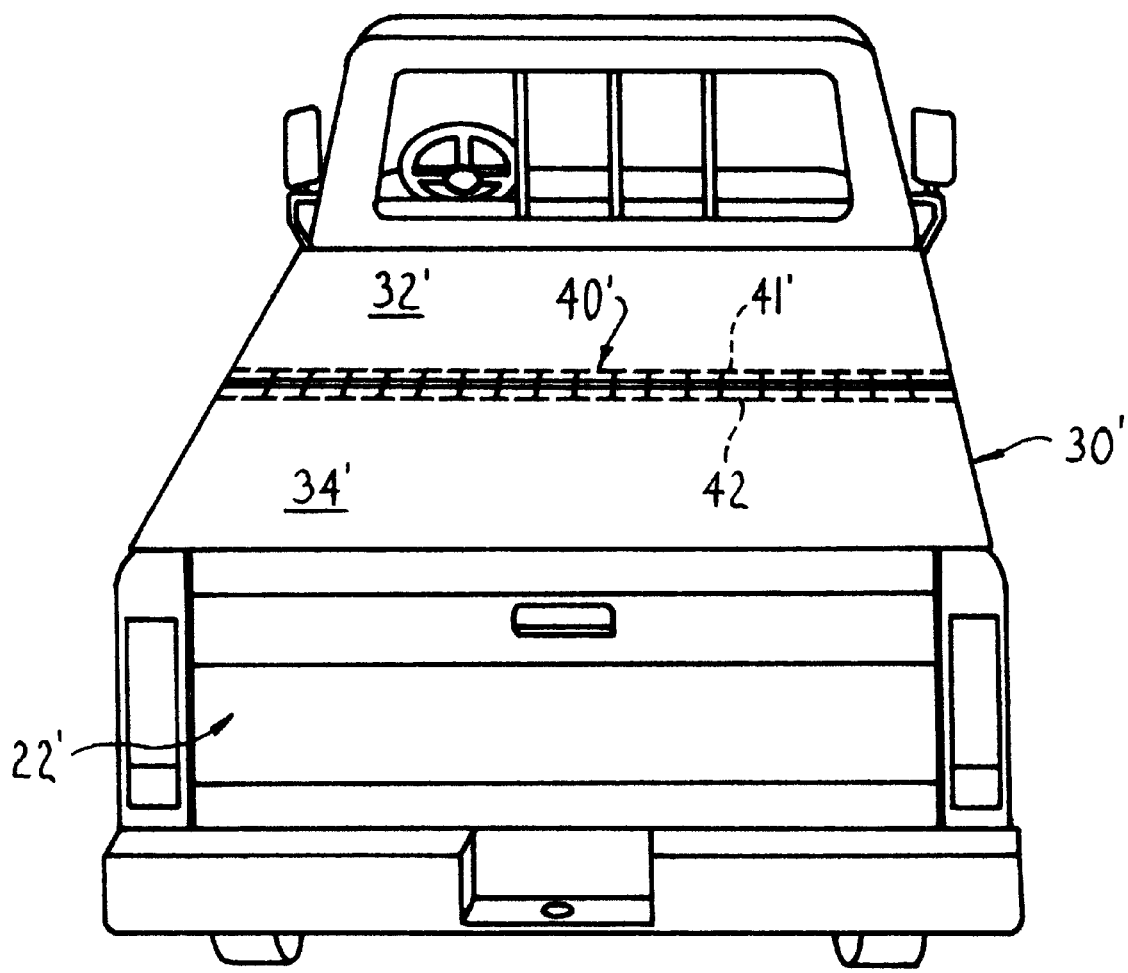
FIG. 5 is a perspective view of a pickup truck having a tonneau cover in accordance with another embodiment of the invention.
Figure 6:
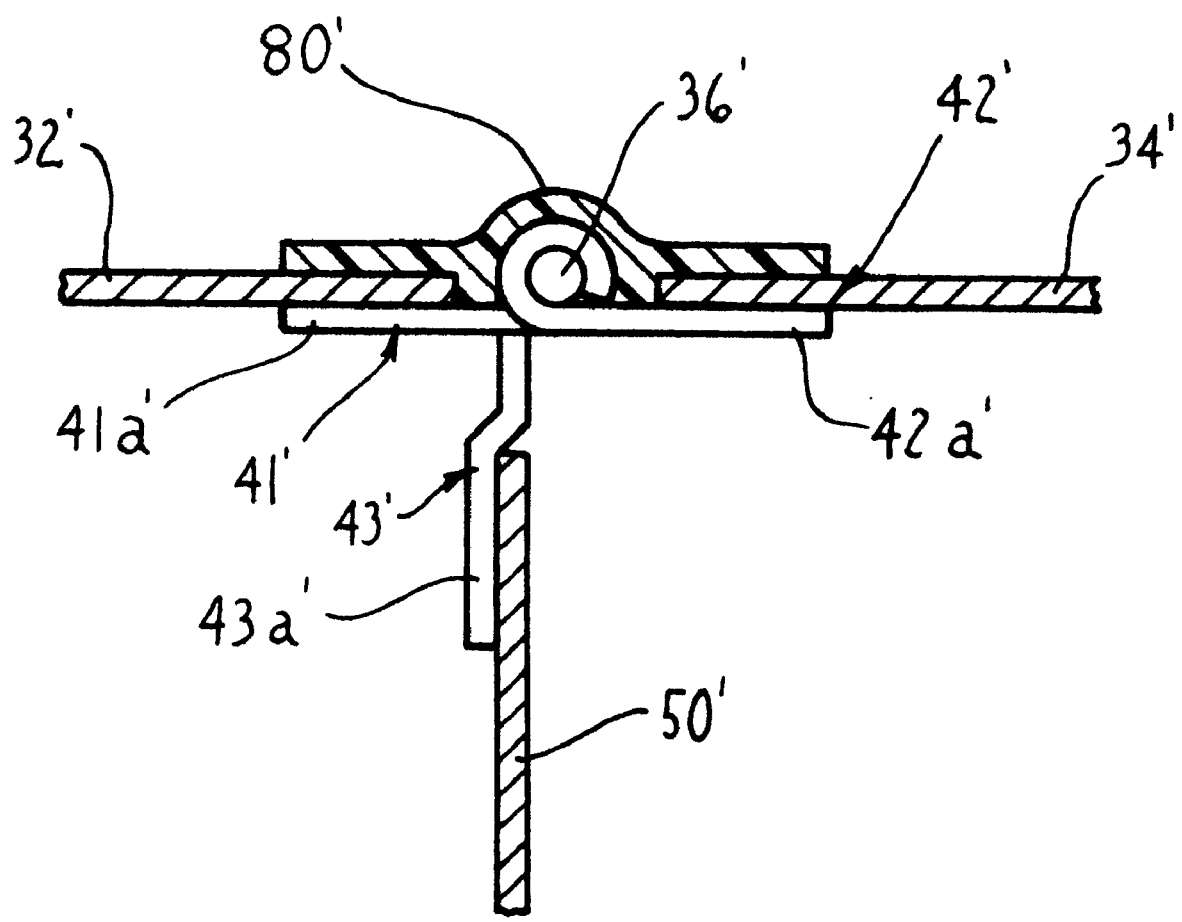
FIG. 6 is partial sectional view of the hinge mechanism of FIG. 5.

Referring to FIGS. 5 and 6 where like features are represented by like reference numerals primed, another embodiment of the present invention involves a different hinge mechanism 40' for connecting the cover panels 32', 34' and partition 50'. Instead of the hinge leafs being molded or otherwise formed integrally with the cover panels 32' 34' and partition 50', the hinge mechanism 40' of FIGS. 5 and 6 includes arcuate hinge leafs 41', 42', and 43' that are integral therewith and define respective passages to receive hinge pin 36'. The hinge leafs 41' and 42' include projecting flat regions 41a' and 42a' connected by fasteners, adhesive or other fastening techniques to a respective cover panel 32' and 34', while hinge leaf 43' includes projecting flat region 43a' connected by fasteners, adhesive or other fastening techniques to partition 50'. The hinge leafs 41' and 42' are interleaved with partition hinge leafs 43' in a manner to receive common hinge pin 36'. The hinge mechanism 40' typically comprises a piano type hinge with features described above. A waterproof seal 80' can be provided on the hinge mechanism 40' as shown in FIG. 6 to seal out water and yet permit one of the cover panels 32', 34' to be folded back on the other cover panel. A similar waterproof seal (not shown) can be provided on hinge mechanism 40 of FIGS. 1–4. The tonneau cover 30' of FIGS. 5 and 6 is similar in function to that of FIGS. 1–4.

When the pickup truck is in motion, the tonneau cover 30 (30') is secured to the cargo bed walls 16, 18 and tailgate 22 using latch cams L, FIG. 1, on the cover panels 32, 34 and a cooperating striker (not shown) on the cargo bed sidewalls 18 a manner described, for example, in U.S. Pat. No. 5,857,729, teachings of which are incorporated herein by reference. The lock cams L can be located at any suitable location on the cover panels to this end. The cover panels 32, 34 likewise can include a weather stripping seal for sealing on the top surfaces of the cargo bed wall 16, side walls 18, and tailgate 22 as also shown in the aforementioned patent. While the invention has been described with respect to specific embodiments, it is not intended to be limited thereto but rather only as set forth in the appended claims.

What is claimed is:

1. The combination of a tonneau cover and a cargo bed of a pickup truck, said cover comprising first and second cover panels overlying said cargo bed and a cargo bed partition with said panels and said partition being mounted on a common hinge to suspend said partition beneath the cover panels for swinging movement about said hinge independent of said cover panels to an upright partition position to divide the cargo bed into individual compartments and to a stored partition position above a floor of said cargo bed.

2. The combination of claim 1 wherein said partition is releasably secured in the upright position to opposite side walls of said cargo bed.

3. The combination of claim 1 wherein said cover includes means on an underside for releasably securing said partition in a stored position adjacent to the cover above a cargo bed floor.

4. The combination of claim 1 wherein said means comprises at least one snap clip that snaps over an edge of said partition.

5. The combination of claim 1 wherein said hinge includes a hinge pin and first hinge leafs that are connected to said first cover panel, second hinge leafs that are connected to said second cover panel, and third hinge leafs that are connected to said partition.

6. The combination of claim 1 wherein said hinge is supported at opposite cargo bed side walls.

7. A method of covering a cargo bed of a pickup truck, comprising hingedly connecting first and second cover panels on a hinge pin to overlie said cargo bed an hingedly suspending a cargo bed partition from said hinge pin for swinging movement about said hinge independent of said cover panels to an upright partition position to divide the cargo bed into individual compartments and to a stored partition position above a floor of said cargo bed.

8. The method of claim 7 further including releasably securing the partition in the upright position to opposite side walls of said cargo bed.

9. The method of claim 8 including releasably fastening to wheel wells of said cargo bed.

10. The method of claim 7 further including releasably securing the partition adjacent said cover in a stored position above a cargo bed floor.

* * * * *

UNITED STATES PATENT AND TRADEMARK OFFICE
CERTIFICATE OF CORRECTION

PATENT NO.   : 6,217,103 B1
DATED        : April 17, 2001
INVENTOR(S)  : Stephanie S. Schultz, et al.

It is certified that error appears in the above-identified patent and that said Letters Patent is hereby corrected as shown below:

Column 4,
Line 43; replace "an" with --- and ---.

Signed and Sealed this

Twenty-third Day of October, 2001

Attest:

*Attesting Officer*

NICHOLAS P. GODICI
*Acting Director of the United States Patent and Trademark Office*